United States Patent
Pocha et al.

(10) Patent No.: US 7,277,605 B2
(45) Date of Patent: Oct. 2, 2007

(54) SILICON FIBER OPTIC SENSORS

(75) Inventors: Michael D. Pocha, Livermore, CA (US); Steve P. Swierkowski, Livermore, CA (US); Billy E. Wood, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 11/132,663

(22) Filed: May 18, 2005

(65) Prior Publication Data

US 2006/0263002 A1      Nov. 23, 2006

(51) Int. Cl.
G02B 6/00 (2006.01)
(52) U.S. Cl. ............................ 385/12; 385/94; 385/128
(58) Field of Classification Search ................. 385/12, 385/94, 128
See application file for complete search history.

(56) References Cited

U.S. PATENT DOCUMENTS

| | | | |
|---|---|---|---|
| 4,595,830 A | 6/1986 | McMahon | |
| 5,202,939 A | 4/1993 | Belleville et al. | |
| 5,392,117 A | 2/1995 | Belleville et al. | |
| 5,589,689 A | 12/1996 | Koskinen | |
| 6,498,870 B1 | 12/2002 | Wu et al. | |
| 2002/0159671 A1 | 10/2002 | Boyd et al. | |
| 2005/0259270 A1* | 11/2005 | Pocha et al. ................ 356/519 |

FOREIGN PATENT DOCUMENTS

| | | |
|---|---|---|
| EP | 0282655 B1 | 2/1994 |
| EP | 0893715 A1 | 1/1999 |

* cited by examiner

*Primary Examiner*—Jennifer Doan
(74) *Attorney, Agent, or Firm*—Michael C. Staggs; John H. Lee

(57) ABSTRACT

A Fabry-Perot cavity is formed by a partially or wholly reflective surface on the free end of an integrated elongate channel or an integrated bounding wall of a chip of a wafer and a partially reflective surface on the end of the optical fiber. Such a constructed device can be utilized to detect one or more physical parameters, such as, for example, strain, through the optical fiber using an optical detection system to provide measuring accuracies of less than aboutb0.1%.

33 Claims, 4 Drawing Sheets

SILICON FIBER OPTIC SENSORS

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to sensors and more particularly, to a Fabry-Perot optical sensor.

2. State of Technology

Fiber optic sensors have a number of beneficial properties over conventional electronic sensors, such as operating in harsh environments, remote sensing, smaller construction, and because such devices are non-electrical, they are not subject to electromagnetic interference. Generally, Fiber optic sensors operate by encoding non-optical external perturbations onto an optical carrier. The design of such a sensor determines whether the external perturbation modulates the amplitude, phase, differential phase, or spectral distribution of the optical carrier.

Most fiber optic sensors are classified into two categories, intrinsic and extrinsic. Perturbations on an intrinsic sensor act on a fiber and the fiber alters characteristics of the internally guided light. An extrinsic fiber optic sensor has a separate device to alter the light. The fiber utilized as part of an extrinsic sensor package, merely acts as a means for getting the light to and from a designed sensor, such as, for example, a Fabry-Perot Etalon.

Background information on a commercially available fiber optic sensor based on a white light Fabry-Perot interferometric readout concept for measuring strain, temperature, etc., can be found on http://www.fiso.com. Such sensors are generally made by precisely positioning and attaching segments of optical fiber in tiny glass capillary tubes.

Additional background information on Fabry-Perot optical sensors can be found in U.S. Pat. No. 5,202,939 and U.S. Pat. No. 5,392,117, both by Bellville et al., issued Apr. 13, 1993 and Feb. 21, 1995 respectively, including the following information from the abstract of the U.S. Pat. No. 5,202,939, "The optical sensing device and the method thereof are for measuring a physical parameter. The device is to be connected to a light source which generates a multiple frequency light signal having predetermined spectral characteristics. The device comprises a Fabry-Perot interferometer through which the light signal is passed, an optical focusing device for focusing at least a portion of the light signal outgoing from the Fabry-Perot interferometer, and a Fizeau interferometer through which the focused light signal is passed. The Fabry-Perot interferometer includes two semi-reflecting mirrors substantially parallel to one another and spaced by a given distance so as to define a Fabry-Perot cavity having transmittance or reflectance properties which are affected by the physical parameter and which cause the spectral properties of the light signal to vary in response to the physical parameter. The Fabry-Perot interferometer is provided with at least one multimode optical fiber for transmitting the light signal into the Fabry-Perot cavity and for collecting the portion of the light signal outgoing thereof. The Fizeau interferometer includes an optical wedge forming a wedge-profiled Fizeau cavity from which exits a spatially-spread light signal indicative of the transmittance or reflectance properties of the Fabry-Perot interferometer. The physical parameter can be determined by means of the spatially-spread light signal."

Accordingly, a need exists for an efficient manufacturing process to produce a novel rugged fiber optic sensor for measuring predetermined physical parameters. The present invention is directed to such a need.

SUMMARY OF THE INVENTION

The present invention is directed to an optical sensor that includes a manufactured chip on a wafer having an elongated central slab arranged on the chip and an optical fiber optically coupled to a reflective surface configured on a free end of the central slab so as to produce an optical cavity; wherein a predetermined attached point on the optical fiber relative to a fixedly attached end of the central slab provides a gauge length. Such a gauge length as provided by the example embodiment enables detection of sensitive changes in the optical cavity so that a physical parameter can be determined.

An additional aspect of the present invention is directed to an optical sensor manufactured on a chip from a wafer that includes an elongate channel having a predetermined length and depth that extends from an open end on the chip and terminates at a bounding wall of the chip. An optical fiber optically is then coupled to a predetermined reflective surface configured on the vertical edge of the bounding wall so as to produce an optical cavity. Moreover, a predetermined attached point on the optical fiber relative to the predetermined reflective surface configured on the vertical edge of the bounding wall provides a gauge length. Such a gauge length as provided by the example embodiment enables detection of sensitive changes in the optical cavity so that a physical parameter can be determined.

A further aspect of the present invention is directed to a method of producing a sensor that includes, microfabricating a chip out of a wafer to produce an elongate central slab fixedly attached to the chip at a predetermined site and terminating at a free end; microfabricating a channel in the chip for receiving an optical fiber; providing a reflective surface on the free end of the elongate central slab; encapsulating with a first and a second side plate, the chip, the elongated central slab, and the channel; and disposing an optical fiber in the channel so as to be optically coupled to the reflective surface on the free end of the elongate central slab, wherein the optical coupling comprises an optical cavity.

A final aspect of the present invention is directed to a method of producing a sensor that includes, microfabricating a chip out of a wafer to produce an integrated elongate channel having a predetermined length and depth that extends from an open end on the chip and terminates at a bounding wall of the chip; providing a reflective surface on the bounding wall of the chip; encapsulating with a plate, the chip and the integrated elongate channel; and disposing an optical fiber in the integrated elongate channel so as to be optically coupled to the reflective surface on the bounding wall of the chip, wherein the optical coupling comprises an optical cavity.

Accordingly, the present invention provides microfabricated devices having measuring accuracies and response times that outperform many conventional sensing systems. Such devices, as disclosed herein, can be utilized as miniature sensors to monitor temperature, strain, pressure, position, etc. in non-hazardous as well as in hazardous environments, in scientific endeavors that can only expand as technology and the consumer base increases.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Referring now to the following detailed information, and to incorporated materials; a detailed description of the invention, including specific embodiments, is presented.

Unless otherwise indicated, numbers expressing quantities of ingredients, constituents, reaction conditions and so forth used in the specification and claims are to be understood as being modified by the term "about." Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contains certain errors necessarily resulting from the standard deviation found in their respective testing measurements.

General Description

Figure 1:
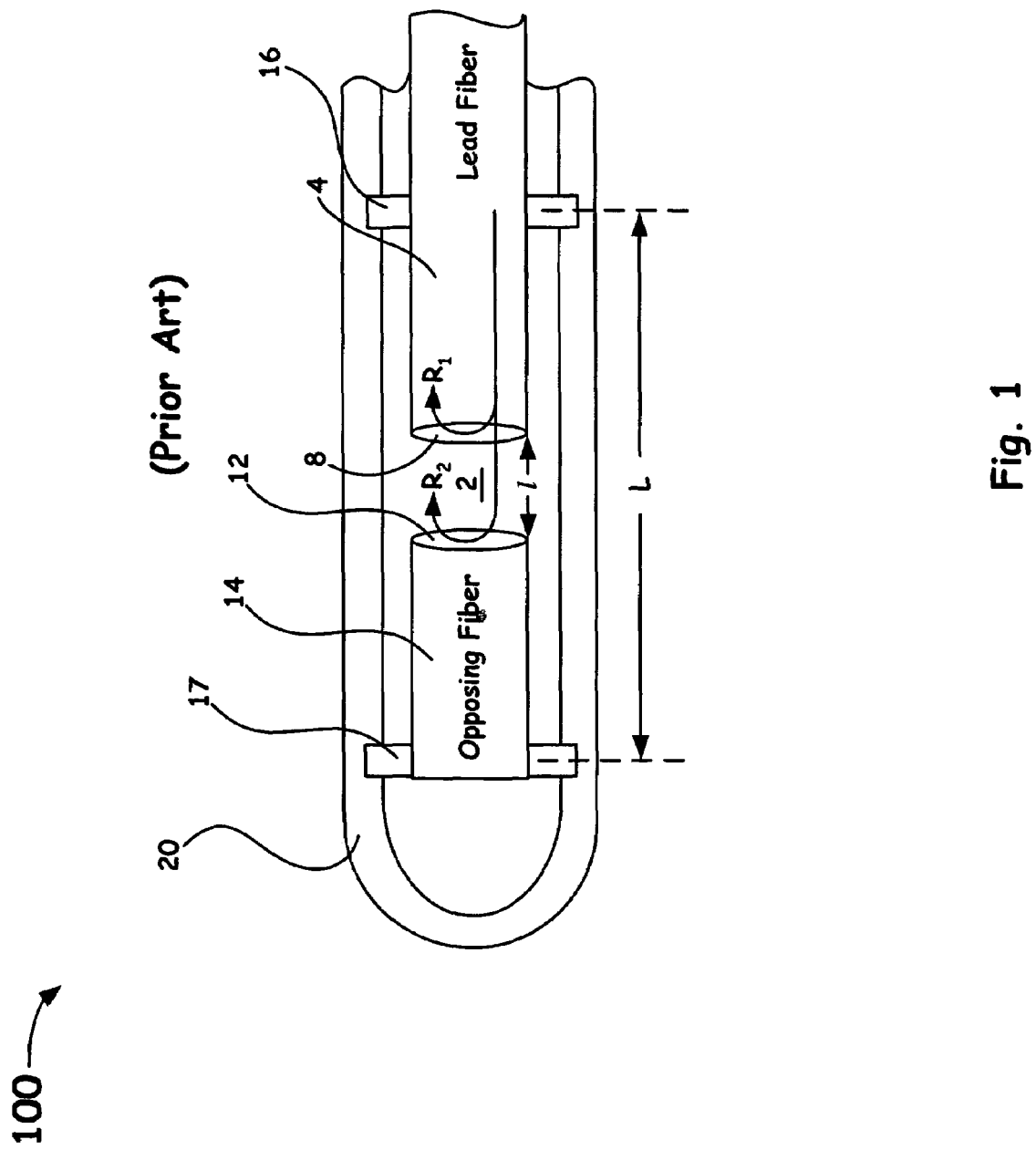
FIG. 1 shows a conventional Fabry-Perot fiber optic sensor.

FIG. 1 shows a conventional Fabry-Perot Sensor and is generally designated by the reference numeral 100. Optical frequencies from a source (not shown) can be directed to a constructed air-gap 2 through an optical lead fiber 4 fixidly attached (shown by the reference numeral 16) to, for example, a glass enclosure 20. Such directed optical frequencies typically undergo a fresnel partial reflection (denoted as $R_1$) of about fifteen percent off an end face 8 of the specially coated lead fiber 4. The rest of the light is transmitted into a constructed air-gap 2 and undergoes a second partial reflection (denoted as $R_2$) off of an end face 12 of an opposing optical fiber 14 fixidly attached (shown by the reference numeral 17) to glass enclosure 20. Such a reflection $R_2$ is directed back through constructed air gap 2 so as to re-enter lead optical fiber 4. When electromagnetic energy from, for example, a broadband source (not shown) is utilized and the width (i.e., a cavity length denoted by the letter l, as shown in FIG. 1) of constructed air-gap 2 is large compared to the spectrum of the wavelengths that make up such a source, such wavelengths undergo constructive and destructive interference that can be analyzed on a monitored return spectrum (not shown). If constructed air-gap 2 is large compared to a predetermined spectrum of wavelengths, small changes in constructed air-gap 2 can be detected. The gauge length of such a sensor is defined as the spacing between the two attachment points 16,17 and denoted in FIG. 1 by L (shown with accompanying arrows to indicate a length within the dashed lines).

From the monitored return spectrum, constructed air-gap 2 can be directly found using the following equation:

$$l \cong \Delta\phi \lambda_1 \lambda_2 / 4\pi(\lambda_1 - \lambda_2); \quad (1)$$

where l is the air-gap 2 width (i.e., a cavity length), $\lambda_1$ and $\lambda_2$ are predetermined wavelengths having a phase difference of $\Delta\phi$. Therefore, by selecting two consecutive peaks from a produced interference spectrum sets $\Delta\phi$ to $2\pi$ because total constructive interference only occurs at such a phase difference.

An important aspect of these sensors is the ability to control the sensitivity by varying the gauge length. The air gap is formed between two fiber members that are attached to the external capillary tube at endpoints separated by gauge length L, as shown in FIG. 1, which is larger than the cavity length l. For illustrative purposes, assume using this device as a strain gauge. Since the internal fiber pieces are free from the external capillary tube, they do not stretch with the strain and therefore the change in cavity gap for a given strain is multiplied by the ratio L/l.

The present invention departs from the above described device by providing a novel sensing element having predetermined micro-fabricated gauge lengths so as to provide a passive sensitive sensor (e.g., the device as shown in FIG. 1) that can be optically interrogated from remote distances of up to about 1 km. Such devices, as disclosed herein, in addition to strain measurement apparatus can also be made into temperature sensors by allowing one end to move freely (by, for example, a single ended attachment to the test specimen). Thus differences in thermal expansion or strain, etc., translate into changing gap of the mirrors. Similarly, those skilled in the art can apply these techniques to sensing other physical parameters.

Specific Description

The present invention utilizes microfabrication techniques to produce novel chips by etching an appropriate set of channels and vertical walls in a substrate, such as, for example, silicon, germanium, etc., to produce a movable mirror with precisely controlled dimensions and allow insertion and attachment of an optical fiber so as to provide the fixed mirror of an interferometer. Such similar microfabrication techniques and devices can be found in Co-pending U.S. application Ser. No. 10/238,660, titled: "Micromachined Fiber Optic Accelerometer" by Steve P. Swierkowski, which is herein incorporated by reference in its entirety.

Accordingly, microfabricated devices of the present invention are formed using IC (integrated circuit) microfabrication technologies known to those skilled in the art, on often crystalline substrates, such as silicon and gallium arsenide, but may be formed on non-crystalline materials, such as glass or certain polymers.

Such materials, as disclosed and utilized herein, may be bonded by processes such as adhesive bonding, fusion at elevated temperatures, anodic bonding, or field-assisted methods. Microfabrication technology incorporated by the present invention, enables the production of electrical, mechanical, electromechanical, optical, chemical and thermal microfabricated devices into a single system so as to allow for batch production of microscale instruments.

Figure 2:
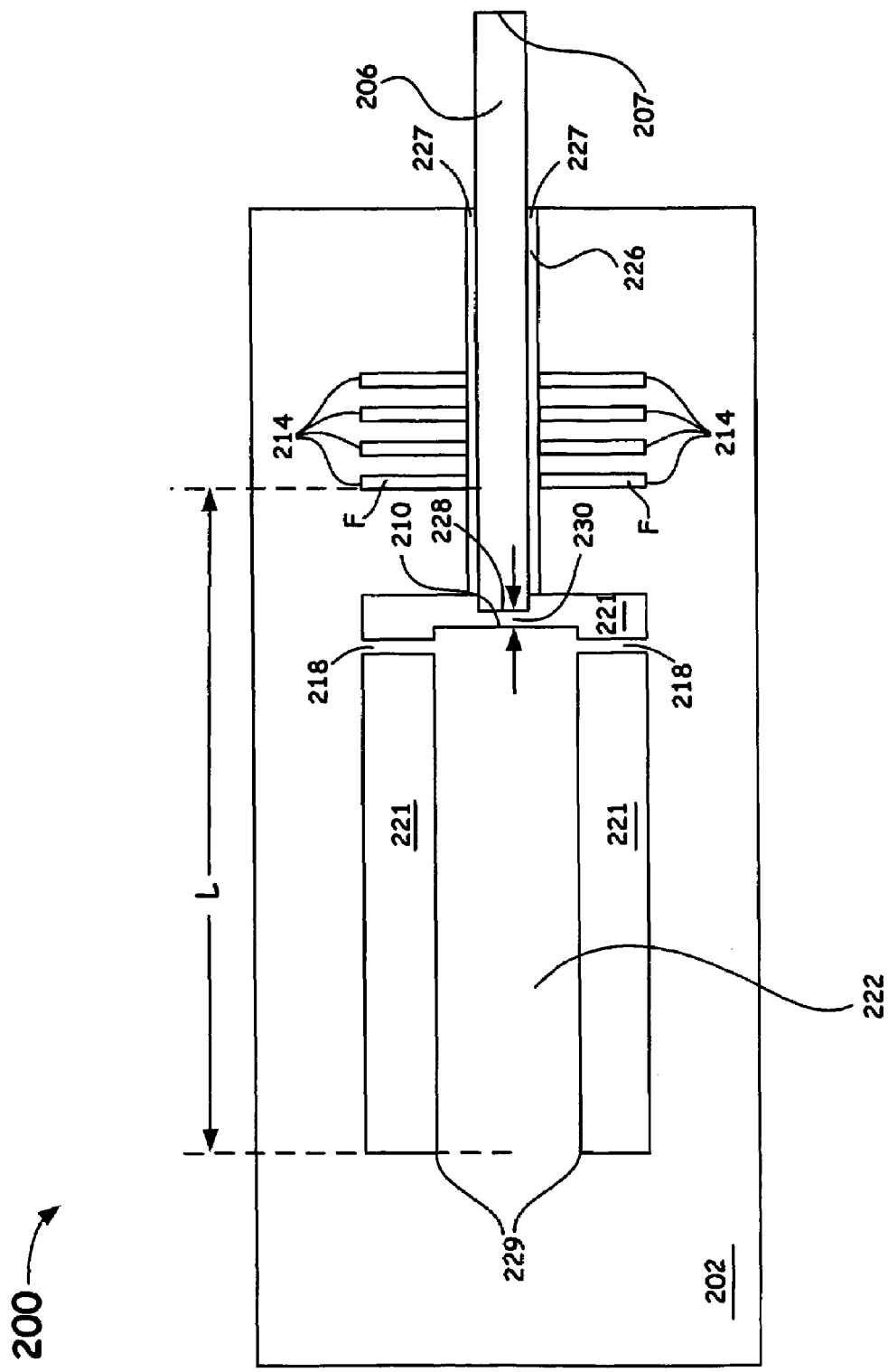
FIG. 2 shows a top view of an example optic sensor embodiment of the present invention.

FIG. 2 shows an optical strain sensor embodiment of the present invention, generally designated as reference numeral 200 that can replace the fiber model, as shown in FIG. 1 above. Using microfabrication techniques, multiple identical pieces of material, such as silicon, can be fabricated to produce multiple identical sensors simultaneously on a single wafer, such as the sensor 200, as shown in FIG. 2. Alternatively, multiple sensors with varying gauge length can be fabricated at the same time to cover a wide range of sensitivities. The only manual step is the attachment of the fiber to the sensor. Such a sensor can be fabricated into a sensor of less than about 7 mm in length and less than about 4 mm in width by etching a desired shape described through a thin wafer using standard etching techniques. One mirror is formed by a partially or wholly reflecting vertical edge surface 210 of a predetermined area of an etched wafer slab 202, often in the center, and the second mirror by a partially reflecting end surface 228 of an attached optical fiber 206 to another predetermined area of etched wafer slab 202, wherein such a fiber is additionally used to bring sensing light into the sensor from an input face 207.

A beneficial and novel aspect of the present invention is a configured gauge length of up to about 5 mm (denoted by the letter L, as shown in FIG. 2), wherein the gauge length is photolithographically set for each manufactured device to provide measuring accuracies greater than the example device illustrated in FIG. 1. Accordingly, by photolithographically defining (e.g., etching through predetermined regions 221) to produce a tethered end 229 of a central slab region 222, and arranging manually, partially reflecting end surface 228 of optical fiber 206 to be situated at a predetermined distance with respect to reflecting vertical edge surface 210, a gauge length can be designed to provide measuring accuracies greater than about 0.1%, depending on the accuracy of the measurement instrument. For example, a change in dimension of about 0.1% of gauge length L can result in an order of magnitude or more change of about 1.0% or greater of an optically interrogated gap width 230.

One or more adhesive wicking "dump" channels 214 serves to confine adhesive (glue or solder) to attach optical fiber 206 to slab 202 material and provide a sharp, precisely defined edge (i.e., denoted by the letter F) of the wicking channels 214, for a designed gauge length. Optionally, one or more flexible tethers 218 can be patterned to support central slab region 222 and prevent off-axis movement in a high vibration environment (for large gauge lengths). Strain sensor 200, as shown in FIG. 2, is beneficial in detecting strain, pressure, etc. indirectly by directly measuring movement of central slab region 222. Slab 202 additionally contains a channel 226 for receiving and positioning optical fiber 206 having a partially reflecting end surface 228.

A Fabry-Perot cavity (shown within opposing arrows, as shown in FIG. 2) is defined between partially reflective end surface 228 of optical fiber 206 and partially or wholly reflective vertical edge surface 210. Partially reflective surfaces are better for these devices as a low finesse cavity is beneficial for broadband readout schemes. A Fabry-Perot cavity, in general, is an optical resonator in which feedback is accomplished by two reflective planes, substantially parallel to one another, and spaced by a predetermined given air-gap width 230. The input face 207 end of optical fiber 206 is coupled optically to a sensor means (not shown), such as for example, an optical spectrum analyzer or any state of the art sensor for detecting movement of the defined Fabry-Perot cavity of the present invention. Optical fibers as disclosed through the present application can often be configured with about a 125 micrometer diameter fiber. However, it is to be understood that other fiber diameters and/or specialized fiber designs (i.e., polarization, single mode and/or multimode fibers) can be utilized without departing from the spirit and scope of the present invention.

By utilizing predetermined bandwidths of electromagnetic energy, such as, for example, broadband light, to interrogate the device, the designed air-gap width 230 of about 5-25 micrometers of the present invention can determine the phases present for the different wavelengths that are present in the reflected light.

Accordingly, a resultant reflected spectrum having phase information in it, can be processed by optical methods, known to those skilled in the art, to determine the gap for the Fabry-Perot cavity and thus a desired unknown physical parameter with a very high degree of accuracy and stability.

Returning to FIG. 2, vertical edge surface 210 may, as an example arrangement, be a micromachined smooth silicon surface to produce a mirror-like surface having a predetermined reflectivity (i.e., full or partial reflectivity). Such a surface can form one mirror of the Fabry-Perot optical cavity with the other mirror of the Fabry-Perot cavity formed by a partially reflecting end surface 228 of optical fiber 206, as discussed above. The transmissive and/or reflective properties of such surfaces contribute to the optical and geometrical factors making up the designed Fabry-Perot cavity of the present invention. Any physical effect, such as strain, that changes a cavity property, can be sensed by optical characterization of the cavity. An optical readout of the position of partially reflecting end surface 228, relative to central slab 222, is achieved by a remote external optical system (not shown) that illuminates the mirrors defining the Fabry-Perot cavity and measures the reflected signals.

Optical fiber 206 is retained in channel 226 by adhesives, soldering, or fusion bonding. Adhesive (not shown), such as, for example, UV curable adhesive, can be deposited at an entrance 227 to channel 226 between optical fiber 206 and channel 226. Channel 226 is often rectangular in shape and optical fiber 206 is generally substantially round in shape. This leaves a space (not shown) between channel 226 and optical fiber 206, wherein applied adhesive is drawn into such a space by capillary action. Wicking channels 214 are often RIE etched channels designed to the sides of main fiber channel 226. Such channels strongly wick and divert an applied adhesive as it initially wicks down channel 226 with excess adhesive diverted so as to not deleteriously penetrate onto end surface 228 of optical fiber 206, air-gap width 230, or partially or wholly reflecting vertical edge surface 210.

Once built, a sensor of the present invention can be encapsulated by attaching materials, such as, but not limited to, glass or silicon covers to the top and bottom using bonding techniques as discussed above. If necessary, a fully operational sensor can be built and tested before encapsulation.

Figure 3:
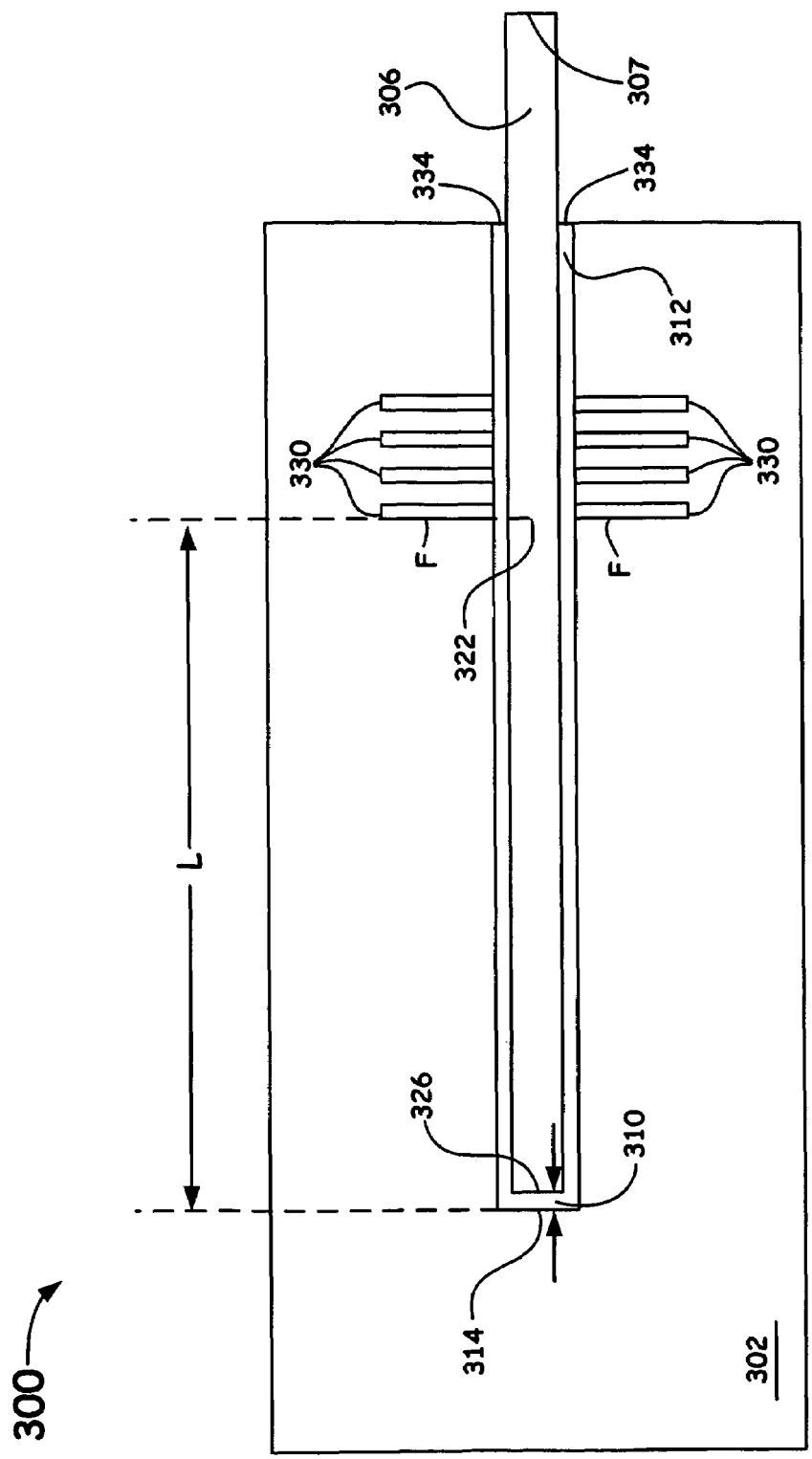
FIG. 3 shows a top view of another example optic sensor embodiment of the present invention.

An alternative example optical sensor arrangement is shown in FIG. 3 and is generally described by reference numeral 300. Here an unconstrained optical fiber segment 306 having an input face 307 to direct interrogation optical frequencies, is arranged within an elongate channel 312 having a predetermined length. It is to be appreciated that the unconstrained portion of optical fiber segment 306 substantially determines the gauge length L of the device. For the device, as shown in FIG. 3, the overall gauge length L is measured from a reflective surface (not shown) configured on vertical bounding edge surface 314 of an etched wafer slab 302, to a predetermined attached point (e.g., 322) of fiber segment 306 arranged on etched wafer slab 302. One of the benefits of such a design is that the cavities in a wafer 302 material, such as, for example silicon, forming the channels for the fiber and the adhesive, do not need to be etched completely through. Such a sensor thus needs only a top cover (not shown) such as, but not limited to, glass or silicon attached using bonding techniques as discussed previously to seal it from the environment.

Such an example beneficial design, as shown in FIG. 3, can also be described through a wafer using standard etching techniques. A Fabry-Perot cavity 310 (as shown within the opposing arrows) is defined by a partially or wholly reflecting vertical bounding edge surface 314 of a predetermined area of a wafer 302 with the second mirror configured on a partially reflective end face 326 of attached optical fiber segment 306. Similar to the example embodiment, as shown in FIG. 2, One or more adhesive wicking "dump" channels 330 serves to confine adhesive (glue or solder) to attach optical fiber segment 306 to etched wafer slab 302 so as to provide a sharp, precisely defined edge for a designed gauge length L. Strain sensor 300, as shown in FIG. 3, is beneficial in detecting strain, pressure, etc. indirectly by directly measuring movement of reflecting surface 314 of etched wafer slab 302 relative to partially reflecting end face 326 of optical fiber 306.

Similar to the beneficial embodiment described above and as shown in FIG. 2, vertical bounding edge surface 314 may be a micromachined smooth silicon surface to produce a mirror-like surface having a predetermined reflectivity (i.e., full or partial reflectivity). Such a surface can form one mirror of the Fabry-Perot optical cavity with the other mirror of the Fabry-Perot cavity formed by a partially reflecting end surface (not shown) configured on the end face 326 of optical fiber segment 306. Such an example arrangement, as shown in FIG. 3, is utilized along with other aspects of the embodiment, to measure any physical effect, such as temperature, that changes a cavity parameter so as to be sensed by optical characterization of the cavity. An optical readout of the position of partially reflecting end face 326, relative to etched wafer slab 302, is achieved by a remote external optical system (not shown) that illuminates the mirrors defining the Fabry-Perot cavity and measures the reflected signals by methods known to those skilled in the art.

Optical fiber segment 306 can be retained in elongate channel 312 by adhesives, soldering, or fusion bonding. Adhesive (not shown), such as, for example, UV curable adhesive, can be deposited at an entrance 334 to elongate channel 312 between optical fiber segment 306 and elongate channel 312. Once again, elongate channel 312 is often rectangular in shape and optical fiber 306 is generally substantially round in shape. This leaves a space (not shown) between elongate channel 312 and optical fiber segment 306, wherein applied adhesive is drawn into such a space by capillary action. Wicking channels 330 are often RIE etched channels designed to the sides of main fiber elongate channel 312. Such channels strongly wick and divert an applied adhesive as it initially wicks down elongate channel 312 with excess adhesive diverted so as to not deleteriously penetrate onto end surface 326 of optical fiber segment 306, air-gap width 310, or partially or wholly reflecting vertical bounding edge surface 210.

A beneficial and novel aspect of the embodiment, as shown in FIG. 3, is the configured gauge length (denoted within dashed lined by the letter L), photolithographically defined by vertical bounding edge surface 314 of etched wafer slab 302 and the first (denoted by the letter F) of the wicking channels 330. Similar to the example embodiment shown in FIG. 2, such a gauge length, as shown in FIG. 3, can multiply the measurement sensitivity, i.e., a change in dimension of about 0.1% of gauge length L, can result in an order of magnitude or more change of about 1.0% or greater of monitored air-gap width 310.

Once built, a sensor of the present invention can be sealed by attaching materials, such as, but not limited to, glass or silicon covers to the top using bonding techniques as discussed above.

Figure 4:
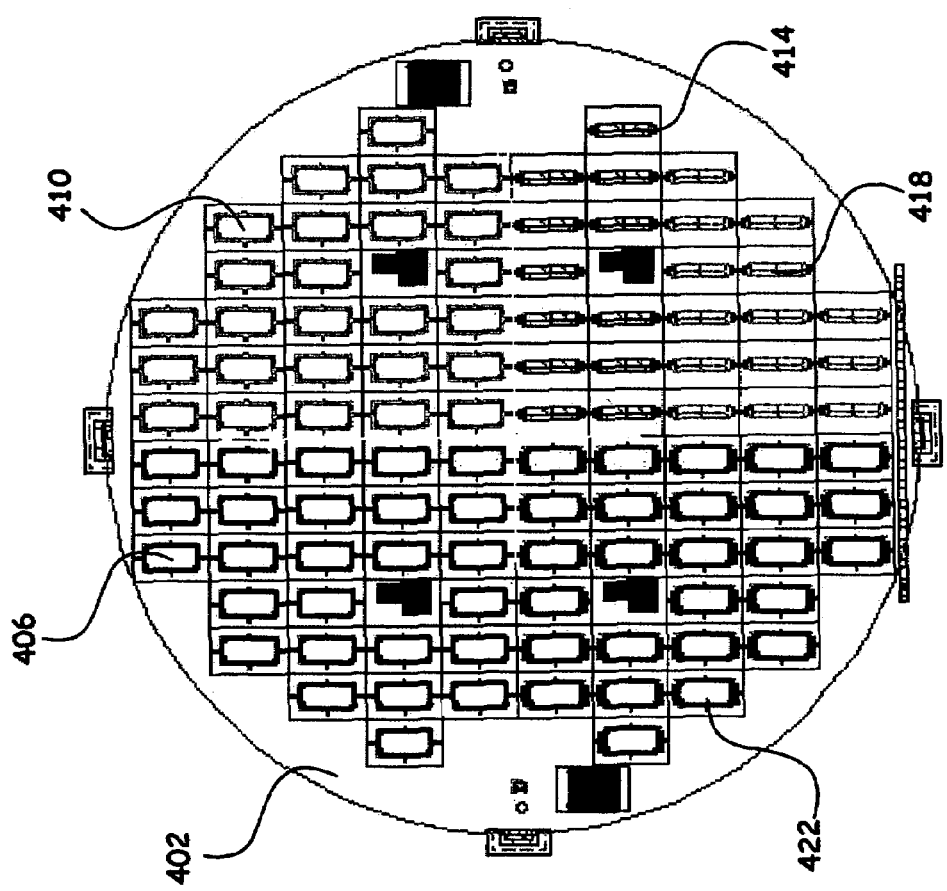
FIG. 4 shows multiple optic sensors fabricated on a wafer.

FIG. 4 illustrates a wafer material 402, such as, but not limited to, glass and/or silicon, having a multiple of manufactured chips 406, 410, 414, 418, 422, of designed sensors, as shown in FIGS. 2 and 3, with identical and/or varying gauge lengths to be manufactured by the techniques of the present invention.

Such devices, as shown in FIGS. 2 and 3, can also be made into temperature sensors by allowing one end to move freely (e.g., by a single ended attachment to the test specimen). Thus, differences in thermal expansion can translate into a changing gap of the mirrors with temperature. By arranging the moving mirror to be made compliant (e.g., by making it thin), a pressure sensor can be made. Similarly, those skilled in the art can apply these techniques to sensing other physical parameters.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

The invention claimed is:

1. A fiber optic sensor, comprising:
   a wafer comprising a chip;
   an elongated central slab integrated into said chip, wherein said elongated central slab comprises a first end fixedly attached to said chip and a free end;
   a predetermined reflective surface configured on said free end of said central slab;
   an optical fiber optically coupled to said predetermined reflective surface of said central slab so as to comprise an optical cavity; wherein a predetermined attached point on said optical fiber relative to said first end fixedly attached to said chip provides a gauge length; and
   means operatively coupled to said optical fiber for detecting sensitive changes in said optical cavity resulting from said gauge length so that a physical parameter can be determined.

2. The sensor of claim 1, wherein said wafer is a silicon wafer.

3. The sensor of claim 1, wherein said elongated central slab comprises a micromachined elongated central slab.

4. The sensor of claim 1, wherein said chip contains an elongated channel for receiving said optical fiber.

5. The sensor of claim 1, wherein said optical cavity comprises a Fabry-Perot cavity.

6. The sensor of claim 1, wherein said sensor is enclosed by a first side plate and a second side plate.

7. The sensor of claim 1, wherein said elongated central slab comprises at least one spring member located proximate the free end of said elongated central slab and fixedly attached to said chip.

8. The sensor of claim 1 wherein said chip comprises one or more adhesive wicking dump channels operatively connected to said channel for receiving said optical fiber.

9. The sensor of claim 1, wherein said physical parameter comprises at least one parameter selected from: strain and thermal expansion.

10. The sensor of claim 1, wherein a plurality of said sensors are capable of being disposed on predetermined chips on said wafer comprising identical gauge lengths.

11. The sensor of claim 1, wherein a plurality of said sensors are capable of being disposed on predetermined chips on said wafer comprising varying predetermined gauge lengths.

12. A fiber optic sensor, comprising:
a wafer comprising a chip;
an integrated elongate channel arranged with a predetermined length and depth that extends from an open end on said chip and terminates at a bounding wall of said chip;
a predetermined reflective surface configured on said bounding wall of said chip;
a substantially unconstrained optical fiber configured within said integrated elongate channel and optically coupled to said predetermined reflective surface so as to comprise an optical cavity, wherein a predetermined attached point on said optical fiber relative to said first reflective surface on said bounding wall of said chip provides a gauge length; and
means operatively coupled to said optical fiber for detecting sensitive changes in said optical cavity resulting from said gauge length so that a physical parameter can be determined.

13. The sensor of claim 12, wherein said wafer is a silicon wafer.

14. The sensor of claim 12, wherein said integrated elongate channel comprises a micromachined integrated elongate channel.

15. The sensor of claim 12, wherein said optical cavity comprises a Fabry-Perot cavity.

16. The sensor of claim 12, wherein said sensor is enclosed by a single plate.

17. The sensor of claim 12, wherein said chip comprises one or more adhesive wicking dump channels operatively connected to said integrated elongate channel for receiving said optical fiber.

18. The sensor of claim 12, wherein said physical parameter comprises at least one parameter selected from: strain and thermal expansion.

19. The sensor of claim 12, wherein a plurality of said sensors are capable of being disposed on predetermined chips on said wafer comprising identical gauge lengths.

20. The sensor of claim 12, wherein a plurality of said sensors are capable of being disposed on predetermined chips on said wafer comprising varying predetermined gauge lengths.

21. A method of producing a sensor, comprising:
microfabricating a chip out of a wafer, said chip comprising an integrated elongate central slab fixedly attached to said chip at a predetermined site and terminating at a free end;
microfabricating a channel in said chip for receiving an optical fiber;
providing a reflective surface on said free end of said elongate central slab;
encapsulating with a first and a second side plate, said chip, said elongated central slab, and said channel; and
disposing an optical fiber in said channel so as to be optically coupled to said reflective surface on said free end of said elongate central slab, wherein said optical coupling comprises an optical cavity.

22. The method of claim 21, wherein said encapsulating step with a first side plate and a second side plate comprises bonding.

23. The method of claim 21, wherein said elongated central slab further comprises a spring tether configured about said free end of said elongated central slab and fixidly attached to said chip.

24. The method of claim 21, wherein said reflective end face of said optical fiber optically coupled to said reflective surface on said free end of said elongate central slab comprises a Fabry-Perot interferometer.

25. The method of claim 21, wherein a predetermined attached point on said optical fiber relative to said fixedly attached end of said central slab to said chip provides a gauge length.

26. The method of claim 25, wherein a plurality of said sensors are capable of being manufactured on predetermined chips on said wafer comprising identical gauge lengths.

27. The method of claim 25, wherein a plurality of said sensors are capable of being manufactured on predetermined chips on said wafer comprising varying predetermined gauge lengths.

28. A method of producing a sensor, comprising:
microfabricating a chip out of a wafer, said chip comprising an elongate channel having a predetermined length and depth that extends from an open end on said chip and terminates at a bounding wall of said chip;
providing a reflective surface on said bounding wall of said chip;
encapsulating with a plate, said chip and said integrated elongate channel; and
disposing an optical fiber in said integrated elongate channel so as to be optically coupled to said reflective surface on said bounding wall of said chip, wherein said optical coupling comprises an optical cavity.

29. The method of claim 28, wherein said encapsulating step comprises bonding.

30. The method of claim 28, wherein said optical cavity comprises a Fabry-Perot interferometer.

31. The method of claim 28, wherein a predetermined attached point on said optical fiber relative to said reflective surface on said bounding wall of said chip provides a gauge length.

32. The method of claim 31, wherein a plurality of said sensors are capable of being manufactured on predetermined chips on said wafer comprising identical gauge lengths.

33. The method of claim 31, wherein a plurality of said sensors are capable of being manufactured on predetermined chips on said wafer comprising varying predetermined gauge lengths.

* * * * *